July 26, 1966        W. E. WINSCHE        3,262,859
ORDERED BED NUCLEAR FUEL ASSEMBLIES
Filed May 20, 1965                    2 Sheets-Sheet 1

INVENTOR.
WARREN E. WINSCHE
BY

July 26, 1966   W. E. WINSCHE   3,262,859
ORDERED BED NUCLEAR FUEL ASSEMBLIES
Filed May 20, 1965   2 Sheets-Sheet 2

INVENTOR.
BY   WARREN E. WINSCHE

United States Patent Office 3,262,859
Patented July 26, 1966

3,262,859
ORDERED BED NUCLEAR FUEL ASSEMBLIES
Warren E. Winsche, Bellport, N.Y., assignor to the United States of America as represented by the United States Atomic Energy Commission
Filed May 20, 1965, Ser. No. 457,536
8 Claims. (Cl. 176—73)

The present invention relates to ordered bed arrangements of particular usefulness in nuclear fuel assemblies in which spherical particles randomly form an ordered arrangement having improved and predictable bed characteristics.

There are many industrial applications such as catalytic reactors and absorption columns which utilize packed beds of spherical particles formed by filling a container by random packing, that is, by merely pouring the spheres into the container. Normally, it is expected that a bed of particles so filled will have a density of from 60–64% of the density for a solid member, and this range compares with the geometrically maximum theoretical value of 74% for a so-called rhombohedral packing. In the range given above, a bed having the lower density is termed a loose bed while the high end of the range refers to a densely packed bed. A full discussion of what is meant by rhombohedral packing and other types of possible packings is given in "Systematic Packing of Spheres," Journal of Geology, vol. 43, Nov.–Dec., 1935, pages 785–909, by Graton and Fraser. Of the various different types of packings which are possible, the rhombohedral packing is capable of producing the highest packing fraction.

It has been found that such randomly packed beds of spheres do not have physical characteristics which are either predictable or reproduceable. For example, the ordinary random packed bed is capable of having a void fraction anywhere in the range specified above, while the void fraction may vary within the randomly packed bed itself. When the bed is designed to be used with a fluid flowing through the bed the pressure drop to be suffered in the bed can not be determined until after the bed is actually formed. Resistance to fluid flow not only depends on the void fraction but also the extent to which openings in successive rows are lined up with each other. In addition, if the bed is to be used over a wide range of temperatures, there is concern for stresses imposed on individual spheres as a result of bed expansion. Spheres become jammed and some fracturing of spheres occurs as a result of the excessive stresses imposed.

In spite of the problems associated with beds of spherical particles, there are considerable advantages which render such beds most useful in a variety of industrial applications, and such beds have been suggested for the possible use in the construction of nuclear fuel assemblies. A bed of spherical particles permits reactions and cooling to take place throughout the whole assembly in a more or less uniform manner and further such a bed is far more economical to prepare than a fixed arrangement requiring a mechanical structure.

At the present time, nuclear fuels generally consist of stacks of elements of fissionable material packed in a tight array which is then clad in stainless steel. The clad assembly is then assembled with similar clad assemblies into the core of a reactor. Spaces between the assemblies are usually left for the passage of coolant and the insertion of poison control rods. The design of such assemblies ordinarily requires close tolerance during construction. As burnup of the fuel within the containers occurs, fission products including gases are released. Accumulation of the fission products and thermal stresses cause some distortion and swelling to occur within the containers. To prevent the development of hot spots due to local throttling of coolant flow and the jamming of control rods due to distortions in the fuel containers, fuel assemblies are usually replaced long before maximum theoretical burnup of the fissionable material has occurred.

It is thus apparent that any fuel arrangement which is capable of extending the useful life of the fissionable material in a reactor would be a substantial improvement and advance in the art. Beds of packed fuel elements hold out the possibility that a bed could, if properly designed, absorb more effectively gaseous fission products and thermal effects with less effect on the outer dimensions of the container. However, effective utilization of packed beds for this purpose heretofore has been limited by the various problems enumerated above.

The present invention has to do with the use of ordered beds of spherical particles as nuclear fuel assemblies and other appropriate applications in which it becomes possible and feasible for the first time to overcome the disadvantages generally associated with randomly packed beds. In addition, certain other advantages are acquired which render the bed most effective and useful in a nuclear reactor and other applications where predictability of bed characteristics, unique ability to absorb thermal charges without imposing excessive stresses on individual elements, bed stability, and other features to be pointed out below, are of great importance.

In a preferred embodiment of this invention there is obtained in a rigid rectangular column a perfectly ordered packed bed of spheres in a rhombohedral array. The bed consists of a series of layers of spheres, the spheres in any layer forming corners of squares and those in the next layer being located in the cusps formed in an adjacent layer. This array is established initially by forming the bottom layer in accordance with a particular pattern, accomplished in a preferred configuration by using a flat, horizontal plate having suitably arranged holes. The packing of the bed is then continued by pouring the spheres at random into the top of the column. The vertical walls of the column are parallel or perpendicular to diagonal lines passing through balls making up square arrays in any layer. When the bed is complete, all of the outside spheres are tangent to the container walls. By proper spacing of the spheres in the bottom layer it is possible to select the packing density factor within a particular range as well as other characteristics as will be seen from the discussion further below. The arrangement and spacing in the bottom layer establishes the nature and characteristics of the bed which is then completed by pouring in spheres at random.

It is thus a first object of this invention to provide a bed of spherical particles having improved characteristics.

Another object of the invention is the provision of an ordered bed of nuclear fuel particles of improved thermal expansion characteristics.

Still another object of this invention is to provide a nuclear fuel assembly of increased stability utilizing a bed of fuel particles.

A further object is a nuclear fuel assembly consisting of an ordered bed of randomly packed spherical particles.

Other objects and advantages of this invention will hereinafter become evident from the following description of preferred embodiments of this invention taken with the accompanying drawings in which.

Figure 1:
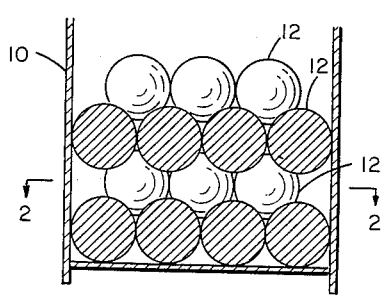
FIG. 1 is a section view in elevation of a container having the ordinary, random-packed rhombohedral array of spheres.
Figure 2:
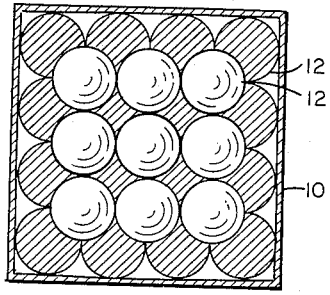
FIG. 2 is a view along 2—2 of FIG. 1.

As an example of the ordinary rhombohedral geometry obtained with a rectangular container, reference is made to FIGS. 1 and 2 in which a square container 10 is filled partially with spheres 12. The shaded and unshaded spheres indicate alternate layers or rows from the bottom. In container 10, balls 12 are stacked by hand, that is, they form a perfect array. However, experiments have demonstrated that when the spheres are randomly packed, that is, poured into container 10, some of the spheres 12 become trapped next to the walls of container 10. This results in a complete disorganization and misalignment of the bed. Tests with cans of diffeernt cross section shape such as rectangular and hexagonal demonstrated the same difficulty as well as certain other additional problems of stacking. In addition, even when stacked by hand, the resulting bed lacks the ability to absorb thermal expansion and other features which are associated with this invention as described below.

Figure 3:
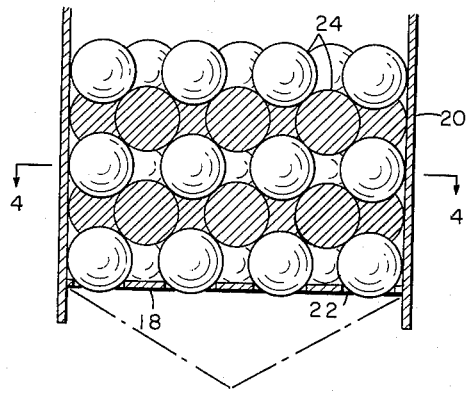
FIG. 3 is an elevation view in section of an ordered bed is accordance with this invention.
Figure 4:
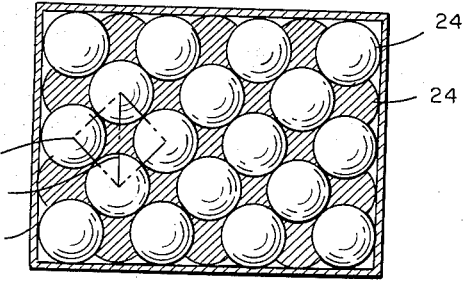
FIG. 4 is a view along 4—4 of FIG. 3.
Figure 5:
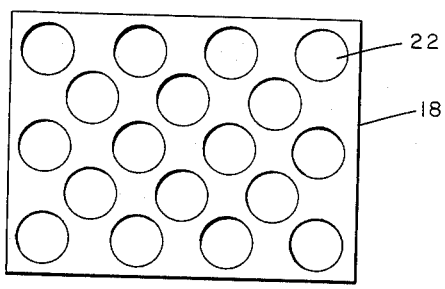
FIG. 5 is a plan view of the support plate shown in FIG. 3.

For a bed of spheres constructed in accordance with the principles of this invention reference is made to FIGS. 3 and 4 wherein is shown nuclear fuel assembly can 20 having a supporting plate 18 with openings 22 to establish the first layer of nuclear fuel containing spheres 24 in the desired arrangement. FIG. 4 shows that the centers of openings 22 will be located at the centers of the unshaded spheres 24 and plate 18 would appear thus as illustrated in FIG. 5. An important difference between the bed of FIGS. 1, 2 and that of FIGS. 3 and 4 is readily apparent from the phantom lines joining the centers of four adjacent spheres 24 in FIG. 4. Each diagonal line D1 of the square produced by the phantom lines is parallel to or perpendicular to a wall of container 20. A similar drawing of phantom lines, if illustrated in FIG. 2, would show a 45° rotation of the square. In other words in accordance with this invention the wall of the container is perpendicular and parallel to diagonal lines in a unit cell. Further, all outside balls are tangent to the container walls, rather than just in alternate layers as in the arrangement illustrated in FIGS. 1 and 2. In the arrangement of FIGS. 3 and 4 the spheres are at the minimum possible spacing arrangement as they touch along diagonal lines. Other spacing arrangements, in accordance with this invention, are described below.

It has been found from filling containers of the type illustrated in FIGS. 3 and 4 having supporting plate 18 to establish the array of the type illustrated, that the spheres will ordinarily fill the container in a perfect manner. Occasionally, when a hole is created by the absence of a sphere in place, the hole is locked in place by the adjacent spheres and the bed continues to build up in the proper configuration, which is an important advantage of this invention. However, in order to avoid the formation of an excessive number of holes, container 20 should be filled by pouring in spheres at such a rate as to permit filling each cusp by one ball rather than in mass.

Figure 6A:
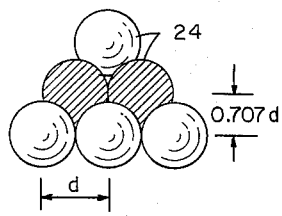
FIGS. 6a, 6b and 6c illustrate a range of spacing arrangements obtainable with the ordered bed.
Figure 6B:
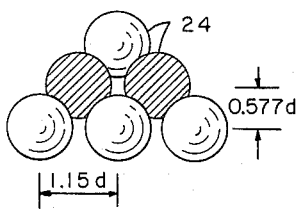
Figure 6C:
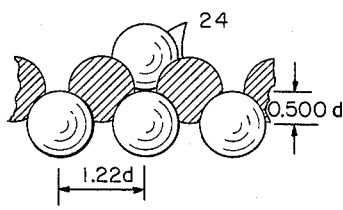
Figure 7:
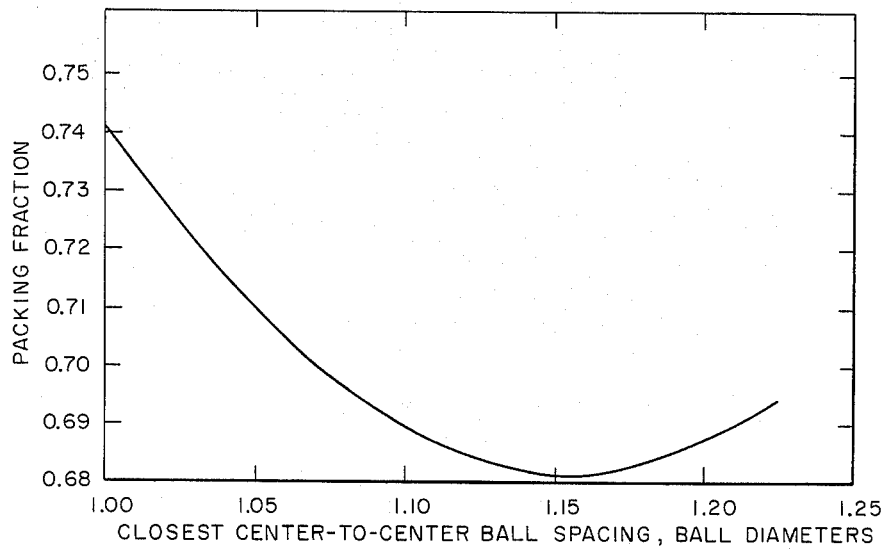
FIG. 7 is a graph showing the range of packing fractions obtainable with different spacing arrangements.

The ordered bed of this invention can be varied as to void fraction and resistance to fluid flow by merely adjusting the spacing of this bottom layer. For example, FIGS. 6a, 6b and 6c show a range of spacing starting in FIG. 6a with the balls touching each other in the first layer, producing the maximum obtainable density with a packing fraction of 0.7405. In FIG. 6b there is shown a center-to-center spacing of 1.15d, where $d$=diameter of the spheres, for a packing fraction of 0.6802. The widest possible layer spacing is in FIG. 6c where is illustrated a center-to-center spacing of 1.22d for a packing fraction of 0.6981. The widest possible spacing of spheres is such that the adjacent layers of spheres are just touching each other. The figures also indicate the vertical center-to-center spacing between horizontal layers of the spheres. A graph illustrated in FIG. 7 shows graphically the range of packing fraction obtainable by different spacing of the spheres.

Figure 8:
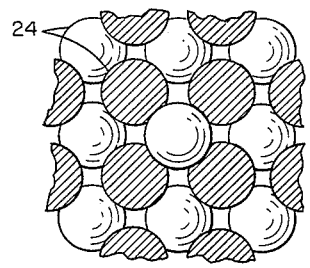
FIG. 8 is a plan view of the arrangement shown in FIG. 6c.

Referring to FIG. 8 there is illustrated another important feature of this invention. When the spheres in the bottom layer are spaced from each other, as in FIGS. 6b and 6c, the voids between spheres in different layers become aligned with each other in a vertical direction, so that the flow of liquid through the bed becomes simplified. This is a characteristic feature of this invention which makes it possible a scan the bed after formation radiographically and visually to veryfy the integrity and uniformity of the bed, channel size, and vacancies which may exist.

While the ordered beds here described are begun by the use of perforated bottom plate, other variations are possible. Instead of a flat base, a wire grid may be used instead whose mesh dimensions would conform to the center-to-center sphere spacing in the bed, or there may be used a permanently attached single row of spheres, or any other such similar mechanical construction.

In addition, the ordered bed can be begun by using a reverse pyramid as illustrated in phantom in FIG. 3. However, as the pyramid produces the arrangement of spheres illustrated in FIG. 1 if the walls of the container extend with the edges coinciding with the corners of the pyramid, it is necessary to slice the pyramid diagonally to obtain the proper relationship between walls and spheres as previously described to produce the ordered bed in accordance with this invention.

Experiments conducted with the ordered bed illustrated in FIGS. 3 and 4 have demonstrated certain important advantages and characteristics of this invention. Relative motion of the bed spheres due to thermal, hydraulic and wall effects occurs in a spring-like action (due to lateral motion of spheres in the same layer if they are not tangent initially). Thus greater burnup of nuclear fuel and improved reactor stability becomes feasible since particle swelling due to radiation effects can be readily accommodated. The bed will remain stable during temperature and power fluctuations, high fuel burnup and reactor life, and variable thermal expansion and flow. Also, little or no particle breakage due to thermal or mechanical stresses and crushing during bed cooling is likely to occur due to the relative motion of the particles as excessive stresses do not have the opportnuity to build up.

Furthermore, from the discussion of FIGS. 6a, 6b and 6c, it is readily apparent that the void fraction of the bed may be accurately designed into the system as desired.

It is also possible, as pointed out, with proper stacking, to align voids vertically in line to form flow channels, thereby reducing the pressure drop of fluid flowing through the bed, since the flow passages are shorter and less circuitous. In a nuclear reactor, this would permit the use of the spaces for control rods, power and instrument cables, etc. without affecting the bed geometry or packing density and even permit the separation of the bed into different zones by locating rods or other barriers in these passages.

The ordered bed is also able to accommodate particles of differing sizes without diminishing its stability. For example, the effect of random drops of mixtures of two sizes of balls on the order of the bed packing was studied. Two diameter sizes, in one experiment, differed by 5% and the spheres were mixed in various proportions in the range of 10 to 50% for the larger size. The larger balls were found to be randomly distributed throughout the bed packing and good bed order was maintained throughout. Experiments were run using some balls 20% of larger size which showed that any defects which were caused were local and the bed healed itself without ever becoming disordered.

It is thus seen that there has been provided a unique arrangement of spherical particles forming a bed having properties of special interest in the construction of fuel assemblies in a nuclear reactor and other applications. While only preferred embodiments of the invention have been described it is understood that variations may be made without departing from the principles of this invention. Hence, the invention is not to be limited thereby but is to be defined only by the scope of the appended claims.

I claim:

1. An ordered bed of spherical particles substantially identical in size consisting of a series of horizontal layers of said particles, the particles in any layer forming corners of squares and located in the cusps formed by the particles in an adjacent layer, means consisting of vertical, flat walls forming a container in rectangular cross-section enclosing said particles, each of said walls being parallel to some of the diagonal lines of said squares, said lines passing through the centers of said particles, and at right angles to the remainder of said diagonal lines, and means to establish the bottom layer of particles.

2. The ordered bed of claim 1 in which vertical channels are formed by voids between particles.

3. The ordered bed of claim 2 in which the particles in any layer are spaced along the sides of said squares with a center-to-center distance in the range of from touching of adjacent spherical particles to spacing whereby the next adjacent layers of spheres are just touching each other.

4. The ordered bed of claim 3 in which the range of spacing is 1.0$d$ to 1.22$d$ where $d$ is the diameter of said particles.

5. The ordered bed of claim 1 in which all outer particles are tangent to a wall.

6. A nuclear fuel assembly comprising a container of rectangular cross-section formed by two pair of oppositely facing, vertically extending parallel flat walls and means establishing within said container an ordered bed of spheres of substantially identical size, said bed consisting of horizontal plane layers of spheres of which in each layer the spheres form corners of squares and are located in the cusps formed by the spheres in an adjacent layer, said bed oriented so that each diagonal line passing through a square of spheres is parallel to one pair of said walls.

7. The nuclear fuel assembly of claim 6 in which all outer spheres are tangent to a wall.

8. The nuclear fuel assembly of claim 7 in which vertical coolant channels are formed by voids between spheres.

References Cited by the Examiner

UNITED STATES PATENTS 3,039,945   6/1962   Slack et al. _____ 176—45 X

OTHER REFERENCES

Chalmers, Physical Metallurgy, October 1959, pp. 25, 48 and 50.

Guy, Elements, of Physical Metallurgy, 2nd edition, 1959, pages 74 and 80.

BENJAMIN R. PADGETT, *Acting Primary Examiner.*

M. J. SCOLNICK, *Assistant Examiner.*